United States Patent
Karnik et al.

(10) Patent No.: US 7,305,431 B2
(45) Date of Patent: Dec. 4, 2007

(54) AUTOMATIC ENFORCEMENT OF SERVICE-LEVEL AGREEMENTS FOR PROVIDING SERVICES OVER A NETWORK

(75) Inventors: Neeran M Karnik, New Delhi (IN); Arun Kumar, New Delhi (IN); Girish B Chafle, New Delhi (IN); Alaa S Youssef, Valhalla, NY (US); Ruby Arora, Delhi (IN)

(73) Assignee: International Business Machines Corporation, Armonk, NY (US)

( * ) Notice: Subject to any disclaimer, the term of this patent is extended or adjusted under 35 U.S.C. 154(b) by 793 days.

(21) Appl. No.: 10/261,817

(22) Filed: Sep. 30, 2002

(65) Prior Publication Data
US 2004/0064557 A1     Apr. 1, 2004

(51) Int. Cl.
G06F 15/16     (2006.01)
(52) U.S. Cl. .................. 709/203; 709/207; 709/217; 709/225; 709/226; 709/228; 709/229; 709/232; 709/233; 709/235; 709/241; 705/52; 370/230; 370/232; 370/235
(58) Field of Classification Search ................ 709/203, 709/207, 225, 226, 229, 233, 217, 228, 232, 709/235, 241; 370/230, 232, 235; 705/52
See application file for complete search history.

(56) References Cited

U.S. PATENT DOCUMENTS

| | | | |
|---|---|---|---|
| 5,796,956 A * | 8/1998 | Jones ..................... 709/233 |
| 6,331,986 B1 * | 12/2001 | Mitra et al. ................ 370/468 |
| 6,466,977 B1 * | 10/2002 | Sitaraman et al. ........... 709/225 |
| 6,553,568 B1 * | 4/2003 | Fijolek et al. ............... 725/111 |
| 6,625,650 B2 * | 9/2003 | Stelliga ...................... 709/226 |
| 6,643,612 B1 * | 11/2003 | Lahat et al. ................. 702/186 |
| 6,681,232 B1 * | 1/2004 | Sistanizadeh et al. .... 707/104.1 |
| 6,690,646 B1 * | 2/2004 | Fichou et al. ................ 370/231 |
| 6,701,342 B1 * | 3/2004 | Bartz et al. .................. 709/200 |
| 6,704,289 B1 * | 3/2004 | D'Souza et al. ............. 370/252 |
| 6,718,361 B1 * | 4/2004 | Basani et al. ................ 709/201 |
| 6,763,389 B2 * | 7/2004 | Kryskow, Jr. ................ 709/229 |
| 6,795,441 B1 * | 9/2004 | Widmer et al. ........... 370/395.4 |
| 6,801,940 B1 * | 10/2004 | Moran et al. ................. 709/224 |
| 6,895,472 B2 * | 5/2005 | Neiman et al. .............. 711/118 |
| 6,904,054 B1 * | 6/2005 | Baum et al. ................. 370/467 |
| 6,914,883 B2 * | 7/2005 | Dharanikota ............. 370/230.1 |
| 6,925,493 B1 * | 8/2005 | Barkan et al. ............... 709/223 |
| 6,970,424 B2 * | 11/2005 | Fawaz et al. ................ 370/232 |
| 6,976,087 B1 * | 12/2005 | Westfall et al. ............. 709/238 |
| 6,981,029 B1 * | 12/2005 | Menditto et al. ............ 709/217 |
| 7,058,704 B1 * | 6/2006 | Mangipudi et al. .......... 709/223 |
| 7,061,861 B1 * | 6/2006 | Mekkittikul et al. ......... 370/230 |

(Continued)

OTHER PUBLICATIONS http://www.jamcracker.com Apr. 19, 2002.

(Continued)

Primary Examiner—Michael Y. Won
(74) Attorney, Agent, or Firm—Gibb & Rahman, LLC (57) ABSTRACT

The invention deals with the enforcement of Service Level Agreement for the services provided over a client-server network. The invention discloses a method, system and a program product for automatic enforcement of SLAs. This is achieved by automatic metering of requests for service and allocation of resources of the server based on the SLA, current available resources and the needs of the customer.

26 Claims, 7 Drawing Sheets

U.S. PATENT DOCUMENTS

| | | | |
|---|---|---|---|
| 7,072,344 B2 * | 7/2006 | Abdelilah et al. | 370/395.21 |
| 7,082,463 B1 * | 7/2006 | Bradley et al. | 709/223 |
| 7,110,362 B2 * | 9/2006 | Kato | 370/236.1 |
| 7,120,694 B2 * | 10/2006 | Sinha | 709/228 |
| 2002/0107908 A1 * | 8/2002 | Dharanikota | 709/203 |
| 2002/0129123 A1 * | 9/2002 | Johnson et al. | 709/219 |
| 2003/0115310 A1 * | 6/2003 | Klotsche | 709/223 |

OTHER PUBLICATIONS http://www.loudcloud.com Apr. 19, 2002.

* cited by examiner

AUTOMATIC ENFORCEMENT OF SERVICE-LEVEL AGREEMENTS FOR PROVIDING SERVICES OVER A NETWORK

BACKGROUND OF THE INVENTION

1. Field of the Invention

The invention relates to the enforcement of Service Level Agreements (SLAs) for delivery of software services over a network.

2. Description of the Prior Art

The Internet, also referred to as an "internetwork", is a set of computer networks, possibly dissimilar, joined together by means of gateways that handle data transfer and the conversion of messages from the protocols of the sending network to the protocols used by the receiving network (with packets if necessary). When capitalized, the term "Internet" refers to the collection of networks and gateways that use the TCP/IP suite of protocols.

The Internet has become a widely used source of information and entertainment content. With the passage of time users, particularly business users have discovered new ways of using the Internet as a medium for enhancing business effectiveness or generating business opportunities. As a result E-commerce has emerged as the new paradigm of transacting business over the Internet. More recently, the Internet has also begun to be used as a medium for providing software services. This activity has spawned the emerging field of "Web Services". Remotely located service providers provide software services to clients from a central or distributed resource over the Internet. The client utilizes the hardware and software resources of the service provider without having to invest in these resources himself. The services may include specialized or proprietary software that is not otherwise available to the client. As the offered services are a source of revenue for the service provider and are therefore paid for by the customer, these services are generally required to be supplied against a formal or informal contract, generally termed as a "Service Level Agreement (SLA)". The SLA defines the scope and level of services provided as well as service level guarantees that ensure quality of service delivered. The service provider is required to comply with the terms of the SLA. At the same time the service provider also needs to enforce the terms of the SLA in terms of the scope and level of guarantees. These actions of ensuring and enforcing compliance have to be implemented automatically with little or no human intervention.

Applications that utilize web services would require different services at different times. These services would also generally be shared amongst several customers to enable economies-of-scale for the service providers as well as to make it cost-effective for the customers who would generally use the services for only short periods spread over time. Given the "as needed" usage of the services customers would generally prefer to pay on the basis of actual usage rather than on a fixed-rate basis. At the same time, given the critical nature of the majority of the services a customer would prefer to use a service that adheres to pre-negotiated SLA parameters, especially in the presence of such resource sharing. These requirements underline the need for automatically monitoring and controlling customer usage. Manual control is infeasible for such purposes.

Unlike outsourcing wherein the customer hands over the job to a third party based on some agreement incorporating a fee and as an output gets a result, the web-service providers let the customer avail their services programmatically as and when required and bill them based on the Service Level Agreement i.e. the facility of using the service is built within the application and the user is unaware of the fact that he is using a remote service. Existing Web-Service providers such as Jamcracker and LoudCloud either use a monthly subscription model or charge on the basis of resources allocated. In some cases the resource is merely hardware dedicated to a customer, and there are no guarantees.

None of these web-services enforce automatic Service Level Agreements. In automatic SLA enforcement, the service provider should bill the customer based on the actual usage, limit the customer's usage to a threshold defined in the SLA, and at the same time strive to maintain a minimum guaranteed throughput. Further on the need of the customers and subject to the availability of resources, the service provider should be capable of offering more than the promised upper limit thereby generating more revenues and a better customer service model.

SUMMARY OF THE INVENTION

The object of the invention is to provide a method and system for automatic enforcement of SLAs for Web Services.

The second object of the invention is to enable the allocation of available service capacity amongst the current customers.

To achieve the said objectives the invention provides a method and system for automatically enforcing Service Level Agreements (SLAs) between customers and a service provider operating in a client-server arrangement over a network by automatically determining the weighted service requirements of each service request received by the server from each client, automatically verifying whether the determined service requirements are within the current constraints defined by the SLA pertaining to the corresponding customer, and automatically regulating access to available resources from the allocated service resources for the customer, provided the SLA constraints are not violated. The weighted service requirements of each request are determined by measuring and collating the weighted service requirements based on the usage parameters of the service request. The service requirements are verified against the current SLA constraints by collating the weighted service requests for each customer and comparing with defined limits in the SLA. The available service capacity is distributed among current customers based on a predefined allocation policy. The service usage for each customer is regulated against current allocated limits by queuing and/or dropping service requests that exceed the current allocated capacity.

The queue is maintained for each instance of an application running on each customer. This queue acts as a throttling module to regulate the use of services. The dispatch rate of the queued requests determines the requests per unit of pre-determined time at which the particular instance of the application is to be served. This rate is the SLA limit enforced on the instant application for the particular customer. The size of the queue determines the burst rate at which the application can send requests i.e. the longer the queue, the more the service requests that a particular application can send. Requests that result in the queue overflow are discarded.

The rate at which the queue dispatches its contents is configured on pre-defined periodic intervals which could be measured in units of time or number of requests handled etc.

This rate modification takes into consideration the requests by a client and the available resources with the server.

The invention also defines a client server architecture to implement the method.

The invention further defines a SLA wrapper through which the client communicates to the server for accessing the service provided. This client/server side wrapper is provided for measuring the service requirements passed by the clients to the sewer.

BRIEF DESCRIPTION OF THE DRAWINGS

The novel features believed characteristic of the invention are set forth in the appended claims. The invention itself however, as well as a preferred mode of use, further objectives and advantages thereof, will best be understood by reference to the following detailed description of an illustrative preferred embodiment when read in conjunction with the accompanying drawings, wherein:

DETAILED DESCRIPTION

Figure 1:
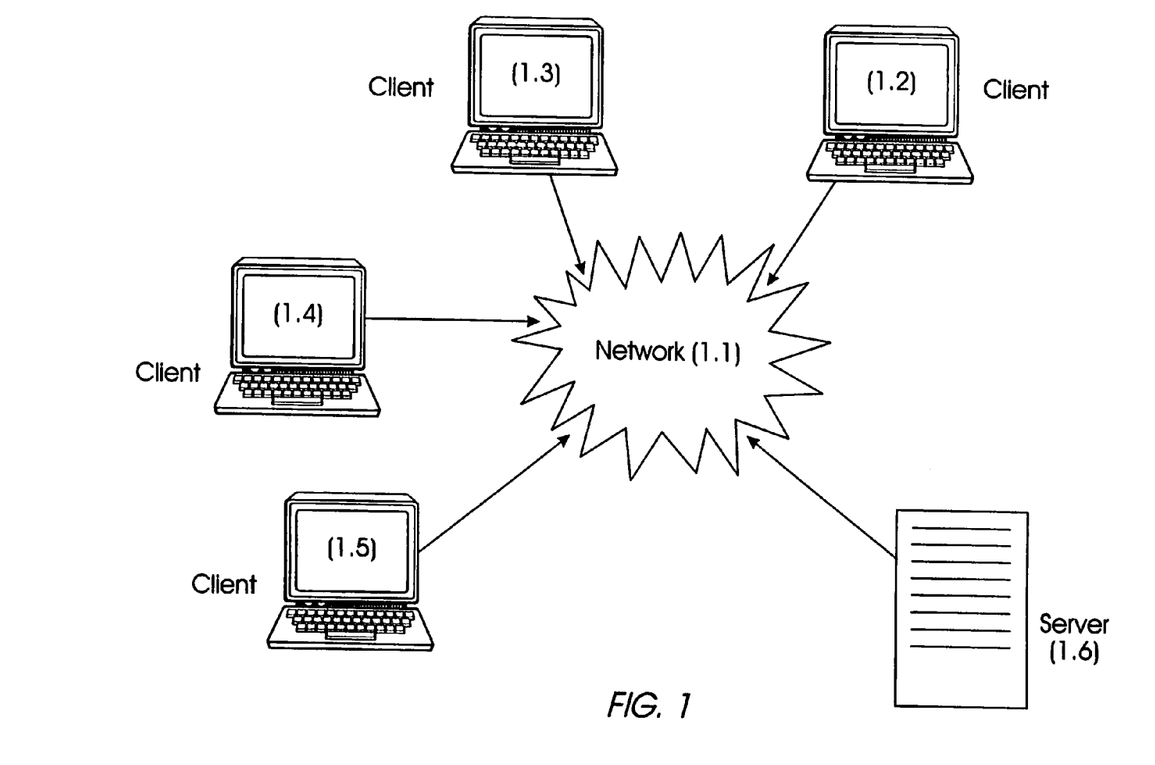
FIG. 1 is a general client-server network.

FIG. 1 shows a general client-server network on which the invention might be practiced. It consists of a server (1.6) connected to a network (1.1). The network could be any type of network like Local Area Network, Internet and the like. Also present on the network are different clients (1.2, 1.3, 1.4, 1.5). The interconnection between different clients on the network could be by any known communication means such as wired means, radio links or by infrared transmissions. The networking topology could be any known topology such as star, linear, ring and the like or a combination of any of these. The clients and the server could use any of the known communication protocols such as TCP/IP, Ethernet and the like for communication. The number of servers and the clients is not limited and the data could reside either on one server or could be distributed over a number of servers. The server (1.6) acts as the service provider and clients send requests to the server for availing the services provided by it. The clients might themselves be the customers (1.2, 1.3) or two or more clients might belong to one customer (1.4, 1.5). The enforcement of SLA is required between the service provider i.e. the server (1.6) and each customer.

The clients (1.2, 1.3, 1.4, 1.5) could be electronic devices like personal computers, mobile phones, interactive televisions and the like, being operated by humans or they could also be software agents running on electronic devices on behalf of individuals or organizations.

Figure 2:
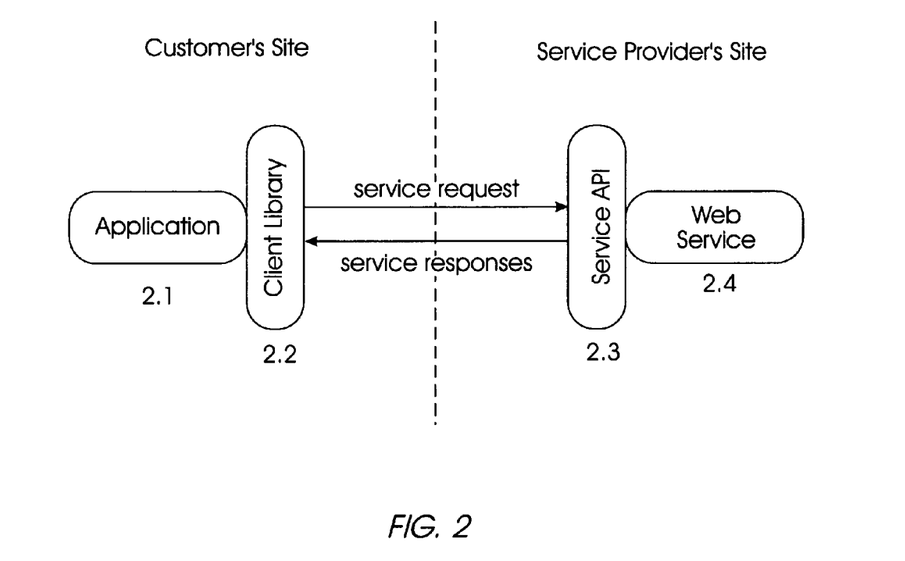
FIG. 2 is a block diagram depicting typical web service architecture.

FIG. 2 shows a typical arrangement for providing web services, according to the known art. The web service (2.4), running on the service provider's site, offers a service API (application, programmer's interface) for using the service (2.3). An application (2.1), running remotely on the client, uses a client library (2.2) to access the web service. This client library implements a communicating protocol between the client and the service, and hides the fact that the service is remote from the application. The client library may be proprietary code like IBM's MQSeries messaging, supplied by the service provider, or it may be a freely available implementation of some standard messaging protocol (e.g. SOAP over HTTP).

Figure 3:
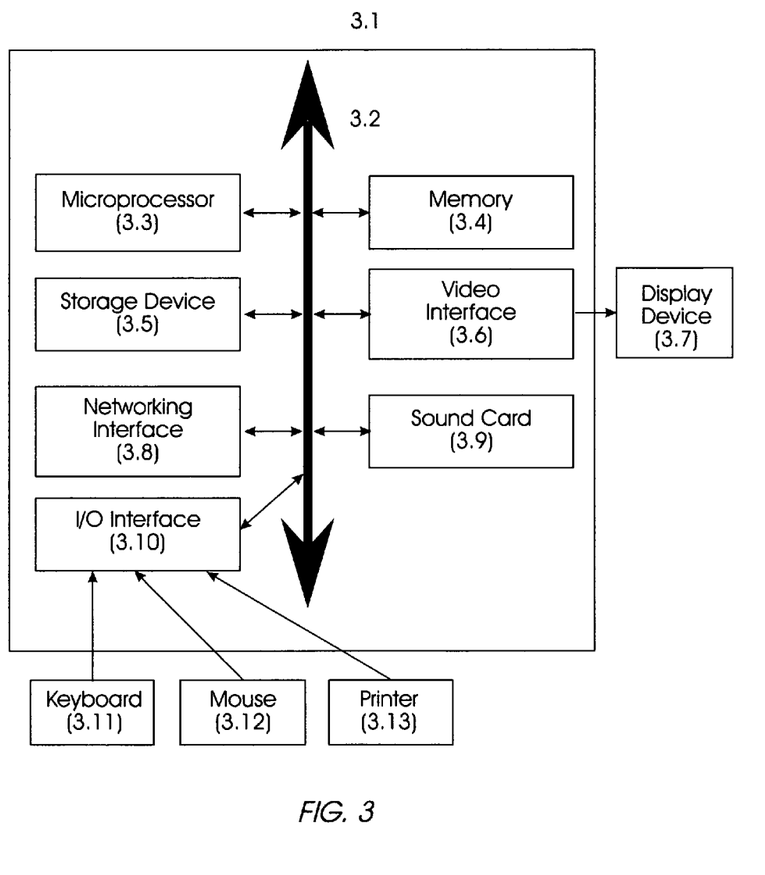
FIG. 3 is a block diagram depicting the internal structure of a general computing system on which the invention might be practiced.

FIG. 3 shows a block diagram of a general computing system (3.1) on which the invention might be practiced. The computer system (3.1) consists of various subsystems interconnected with the help of a system bus (3.2). The microprocessor (3.3) communicates and controls the functioning of other subsystems. The microprocessor (3.3) also acting as the control unit interacts with memory (3.4) to perform operations as defined by the stored instructions. In a general computer system the control module is a microprocessor which could be any commercially available processor of which x86 processors from Intel and 680X0 series from Motorola are examples. The computing system could be a single processor system or may use two or more processors on a single system or over a network. This control module also controls the functioning of the other components of the computing system (not shown). The control module accesses said memory (3.4) through system bus (3.2) that interconnects the parts of the computing device. The control module executes a program called the operating system for the basic functioning of the computer system. The examples of operating systems are UNIX, WINDOWS and DOS. These operating systems allocate the computer system resources to various programs and help the users to interact with the system. Memory (3.4) helps the microprocessor in its functioning by storing instructions and data during its execution. Examples are random access memory such as dynamic random access memory (DRAM) or static memory (SRAM). Storage Device (3.5) is used to hold the data and instructions permanent in nature like the operating system and other programs. Video Interface (3.6) is used as an interface between the system bus and the display device (3.7), which is generally a video display such as a monitor.

The network interface (3.8) is used to connect the computer with other computers on a network through wired or wireless means. Through the same networking interface, the computer system can also connect to the Internet. The computer system might also contain a sound card (3.9). The system is connected to various input devices like keyboard (3.11) and mouse (2.12) and output devices like printer (2.13), through an input/output Interface (3.10). Various configurations of these subsystems are possible. It should also be noted that a system implementing the present invention might use less or more number of the subsystems than described above.

In the preferred embodiment of the invention, the instructions are stored on the storage device (3.5) in the form of a computer program. This program contains coded instructions for different modules like usage requirement determining module, aggregator, resource allocator etc. On running the program, the instructions are transferred to the memory (3.4) and the microprocessor (3.3) executes the instructions. As an example consider the case of a service request being sent to the server which is a general computing system (3.1). It is connected to the Internet through the means of a networking interface (3.10). Also residing on the Internet are the various clients. The instructions are received and then the microprocessor (3.3) sends them to the memory (3.4) through the system bus (3.2). Later on it executes the instructions in the memory (3.4) for determining usage requirement and also acts on it subsequently. Similarly the memory (3.4) would also contain instructions for aggregating the requests, allocating the resources etc. Optionally it would also contain a system monitor module and a module to provide manual control of the system. The monitoring could be with the help of a display device (3.7) and could also be periodically given as output in the form of a hard copy to a printer (3.13). The system can be manually controlled by giving instructions through means of input devices such as keyboard (3.11) and mouse (3.12). All the instructions whether from the program or from the user input go to the memory (3.4) and are subsequently acted upon by the microprocessor (3.3). The system would also have access to a database (not shown) that contains the SLA limits for different customers of the service provider. This database might reside on the computing system itself or it might be an independent database server. It should be understood that the invention is not limited to any particular hardware comprising the computer system or the software running on it.

Those of ordinary skill in the art will appreciate that the various means for generating service requests by the clients and their processing by the server are instructions for operating on the computing system. The means are capable of existing in an embedded form within the hardware of the system or may be embodied on various computer readable media. The computer readable media may take the form of coded formats that are decoded for actual use in a particular information processing system. Computer program means or a computer program in the present context mean any expression, in any language, code, or notation, of a set of instructions intended to cause a system having information processing capability to perform the particular function either directly or after performing either or both of the following:
  a) conversion to another language, code or notation
  b) reproduction in a different material form.

The depicted example in FIG. 3 is not meant to imply architectural limitations and the configuration of the incorporating device of the said means may vary depending on the implementation. Any kind of computer system or other apparatus adapted for carrying out the means described herein can be employed for practicing the invention. A typical combination of hardware and software could be a general purpose computer system with a computer program that when loaded and executed, controls the computer system such that it carries out the means described herein. Other examples of the incorporating device that may be used are notebook computers or hand held computers in addition to taking the form of a PDA, web kiosks or even Web appliances.

Figure 4:
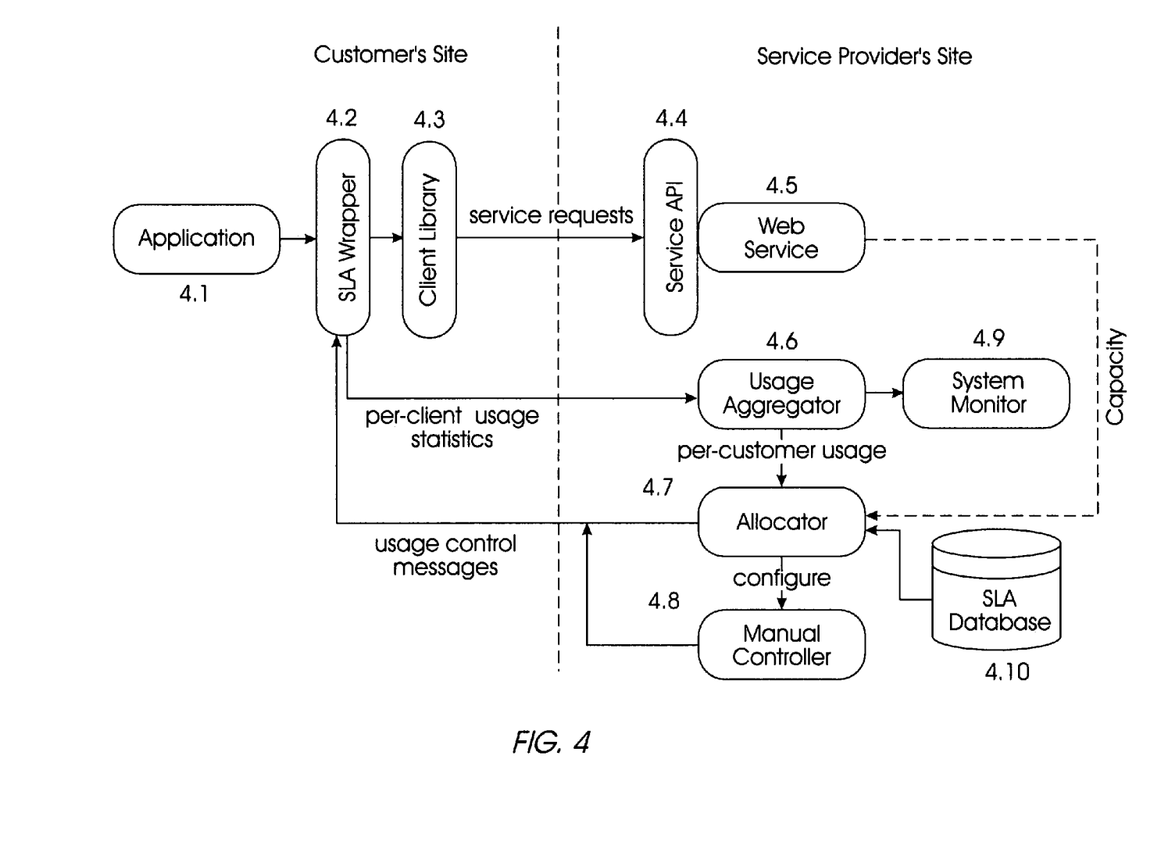
FIG. 4 is a block diagram of one embodiment of the invention.
Figure 5:
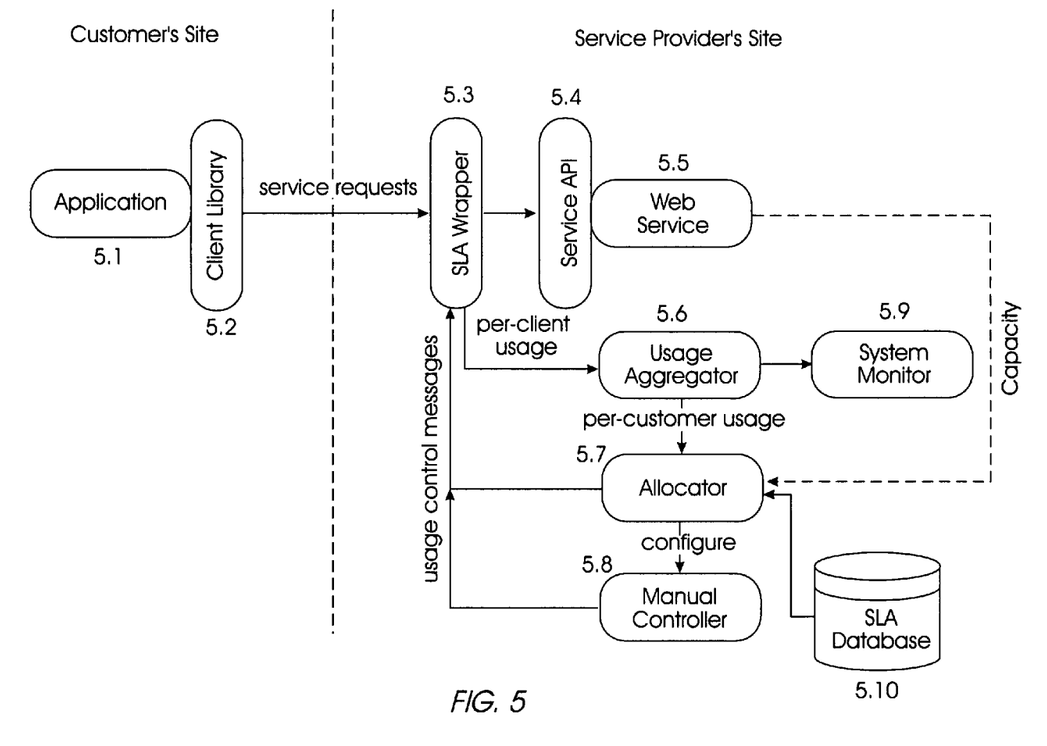
FIG. 5 is a block diagram of an alternative embodiment of the invention.

FIGS. 4 and 5 show two of the embodiments in which the invention might be practiced for SLA enforcement. The basic structure of the service remains the same as shown in FIG. 2. In order to implement the SLA several modules are added.

The SLA Wrapper (4.2, 5.3) measures and reports the application's (4.1, 5.1) usage of the service, it also includes a usage control mechanism for limiting the usage. The Usage Aggregator (4.6, 5.6) computes aggregate statistics on a per-customer basis, by accounting for all active applications of each customer. The allocator (4.7, 5.7) is responsible for computing and adjusting the allocations for active customers. This is done using the current per-customer usage statistics in conjunction with their SLA limits and the currently available capacity of the service.

A SLA Wrapper (4.2, 5.3) is introduced between the application and the service. It could wrap the client library (4.3) as in FIG. 4, or as shown in FIG. 5 it could be on the service provider's site, wrapping the web service itself (5.5). In the first case, one copy of the wrapper exists at each client site whereas in the second case, a single copy at the service provider's site suffices. The wrapper has the same API as the service, and is thus transparent to the application. Every service request by the application is intercepted by the wrapper, before being passed on to the service. The Metering module within the SLA wrapper inspects each request and collects usage statistics (such as the distribution of requests, number and frequency of requests, optionally weighted by the values of parameters in the request). Periodically, the accumulated statistics are reported to the Usage Aggregator (4.6, 5.6) over the network. Collecting statistics in this way enables SLAs to be expressed in terms of metrics relevant to the end-user application, rather than the service provider's internal systems. The SLA wrapper also contains a separate throttling module for regulating usage rates.

At any given time, several users belonging to a customer organization may be running the application, and thus accessing the web service. Each such user's service usage is measured independently by the SLA wrapper, and reported to the Usage Aggregator. The Usage Aggregator accumulates the reported statistics on a per-customer basis. This is necessary because the service provider signs the SLA with a customer organization as a whole. Thus the metrics specified in SLA apply to aggregate usage by the customer. The Allocator module runs periodically, it requests the Usage Aggregator to provide each customer's usage statistics. It is also aware of the capacity of the service in terms of average request over a period of time (the total usage that it can support). This may be a static value determined by benchmarking, or dynamically updated based on the current configuration and status of the hardware used to run the service. Based on each customer's current requirements and SLA limits, the Allocator distributes the available capacity. Different policies can be used depending on the aim of the allocation, e.g. fair sharing of capacity, maximizing revenue generated, ensuring high resource utilization, minimizing perturbation of the current allocation etc.

Two additional components are also included to allow manual monitoring and override the automatic system. The System Monitor (4.9, 5.9) graphically displays the values of several system parameters, allowing administrators to monitor the current state of the system. For example, it shows the current usage (request rates) of different customers, so that the effect of the system's allocation and policing decisions can be observed. The Manual Controller (4.8, 5.8) is a console that allows administrators to manually send usage control messages. It can also be used to set key parameters of the Allocator, or even disable it altogether. This enables the administrator to manually override the allocation algorithm's decisions, if necessary.

A SLA typically uses different types of metrics. Usage metrics determine the units in which service usage is measured for billing purposes. The SLA specifies constraints on usage metrics. These constraints need to be enforced by the service provider. Quality of Service (QoS) metrics, such as response time, may be used to classify customers into different service classes. Such metrics can also be included in the SLA. However, monitoring these metrics is the onus of the customer and he desires that maximum such metrics are adhered to. Hence the enforcement of such metrics is the service provider's primary aim.

For web services, the usage metric for each customer is typically a guaranteed aggregate throughput Gi, in requests per second. However, not all requests are equivalent in terms of the resources needed to service them. The invention defines a reference request with unit weight, and assigns weights to all requests based on their parameters in relation to the reference request. e.g. for a prime factorization service, which finds the prime factors of a given number, the weight of the request can be defined in terms of the size of the number supplied in the request. Gi is then specified in terms of reference requests per second. Similarly, the capacity of the system is defined in terms of the rate of reference requests it can handle while maintaining the desired QoS.

Different aggregation functions can be used in the definition of SLA such as, sum, max, min etc. In the preferred embodiment summation is used as the aggregation function.

The SLA wrapper keeps per-client running totals of the number of requests serviced and dropped, weighted as described above. These are periodically reported to the Usage Aggregator, which in turn keeps per-customer running totals. The Allocator periodically polls the Aggregator to obtain these totals for all customers. Alternatively, the Usage Aggregator could push these values to the allocator. In our preferred embodiment however, we adopt the pull method. The Allocator reloads configuration data such as the service capacity and each customer's SLA limits, it then computes the corresponding throughput rates and drop rates, dividing the usage totals by the time T elapsed since the previous execution of the algorithm. It also resets the running totals in the Usage Aggregator after each sweep.

Let f: $(p_{1r}, p_{2r}, \ldots, p_{nr}) \rightarrow W_r$, where $p_{ir}$ is a parameter of the request and $W_r$ is the weight of the request r.

Let $O_1$, $D_1$ be the throughput and drop rate for customer i respectively.

$$W_r = (p_{1r}, p_{2r}, \ldots, P_{nr}) \quad (1)$$

$$O_1 = (\Sigma_{(\forall r|r \text{ is served in the last } T \text{ interval})} W_r)/T \quad (2)$$

$$D_1 = (\Sigma_{(\forall r|r \text{ is dropped in the last } T \text{ interval})} W_r)/T \quad (3)$$

The objective of the algorithm is to enforce fair sharing of the available capacity amongst the active customers. When the system is lightly loaded, the service provider may choose to allow a customer to exceed its guaranteed throughput, since this results in additional revenue.

The fairness index of the system, F, is defined as the ratio between the capacity of the system and the sum of the guaranteed throughput for all active customers.

$$F = C/\Sigma_{\forall 1} G_1 \quad (4)$$

where C is the total throughput of the system and Gi is the guaranteed throughput for customer i. A customer i whose throughput $O_1 = FG_1$ is utilizing exactly his fair share of the available capacity. The service provider ensures that adequate resources are available to satisfy the usage guarantees for all the active customers and hence F is always greater than or equal to 1.

Given
C—capacity of the system
For each customer i
$G_i$—guaranteed throughput
$M_i$—desired throughput $$M_1 = O_1 + D_1 \quad (5)$$

Find the allocated throughput $A_1$ for each customer i and compute the control parameters required to enforce this.

1. Compute the allocated throughput $A_1$ for each customer i

Phase I: Adjust $M_i$ for each customer i by a safety margin S (0<5<1).

If $M_i \leq G_i$ then $M_1 = M_i(S+1)$
Phase II: Allocate to each customer his fair share
Compute F
For each customer i,
Let $A_1 = \text{Min}(FG_1, M_1)$
Phase III: Distribute any excess capacity, fairly, among unsatisfied customers Repeat Let $F' = (C - \Sigma_{\forall i} A_1)/\Sigma_{(\forall 1|A1<M1)} G_1$ Let $A_1 = A_1 + \text{Min}(F'G_1, M_1 - A_1)$ for each customer i
Until $(C = \Sigma_{\forall 1} A_i)$ OR $(\forall_1 A_1 = M_1)$ 2. Compute the change in throughput required for each customer i $\Delta O_i$: % change in throughput for customer i
$\Delta O_i = ((A_i - O_1)/O_1)100$ After completing the run of the algorithm, for every customer, the Allocator sends a message to the server-side SLA Wrapper (for the case shown in FIG. 5), or to each copy of the wrapper (for the case shown in FIG. 4). The message contains the fractional value $\Delta Oi$ indicating the change in the throughput required to enforce the allocation policy for customer i. The SLA Wrapper receives such control messages, and acts upon them as described below.

In order to regulate the request rate of an application, the wrapper includes a leaky bucket mechanism. Every request made by the application gets added to the bucket. The bucket then sends out these requests to the web service at a particular speed (the leak rate of the bucket). To implement this mechanism, the invention simulates the bucket by maintaining a buffer of weighted requests. The size of the bucket controls the burstiness of the traffic; a bigger bucket size will allow more bursty traffic. A thread simulates the leaking of the bucket by alternately sending requests and sleeping for a period inversely proportional to the leak rate and directly proportional to the weight of the request sent. When the SLA Wrapper receives a control message asking it to adjust the application's usage, it increases or decreases the bucket's leak rate by the given fraction, $\Delta Oi$, depending upon whether $\Delta Oi$ is positive or negative.

Figure 6:
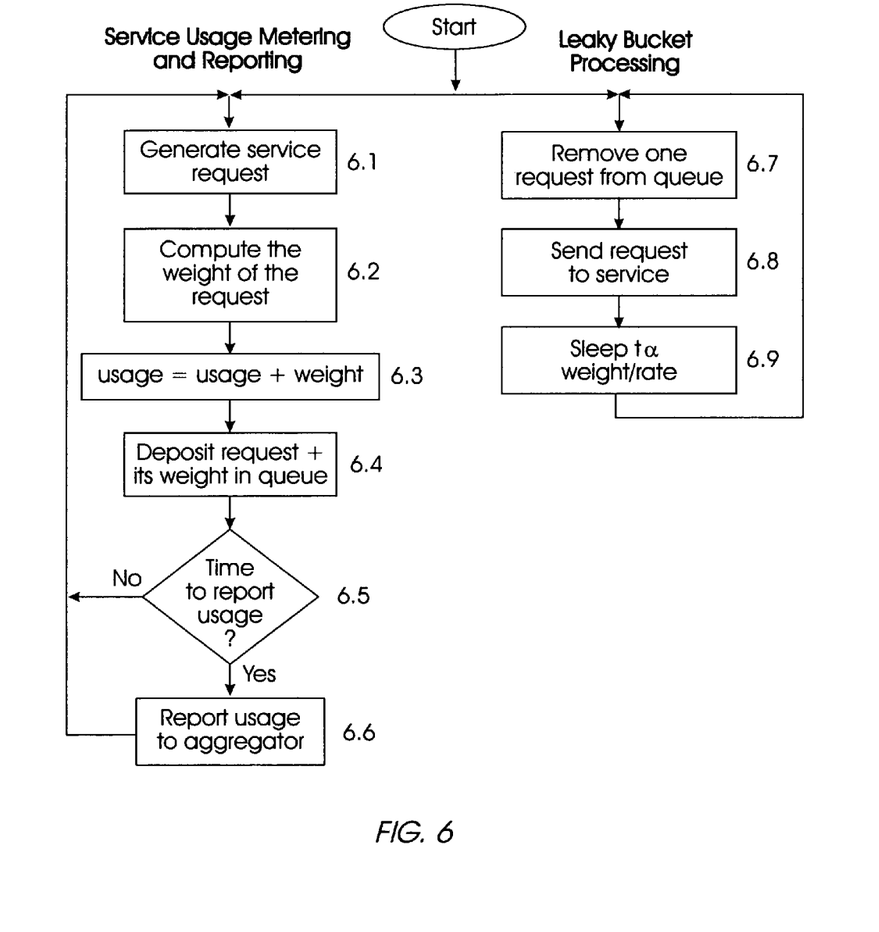
FIG. 6 is a flowchart for the service request processing, usage metering and reporting.

FIG. 6 is a flowchart for the functioning of the usage Metering and the Throttling module residing in the wrapper. On the generation of service request (6.1), the Metering module computes the weight of the request (6.2). For computing the weight of the request, the parameters of the service request are used. This weight is added to the usage of the particular application by the particular customer (6.3). Thereafter this request together with its weight is deposited in the application queue (6.4). The metering module periodically (6.5) reports the statistics to the aggregator (6.6). In this way the cycle continues for each service request.

The Throttling module comprises of the application queue that contains the service request and their weight. The queue is emptied with a leaky bucket mechanism. First, one request is removed from the queue (6.7) and sent to the server (6.8). Then the module sleeps (6.9) for the time that is directly proportional to the weight of the request and inversely proportional to the dispatch rate.

Figure 7:
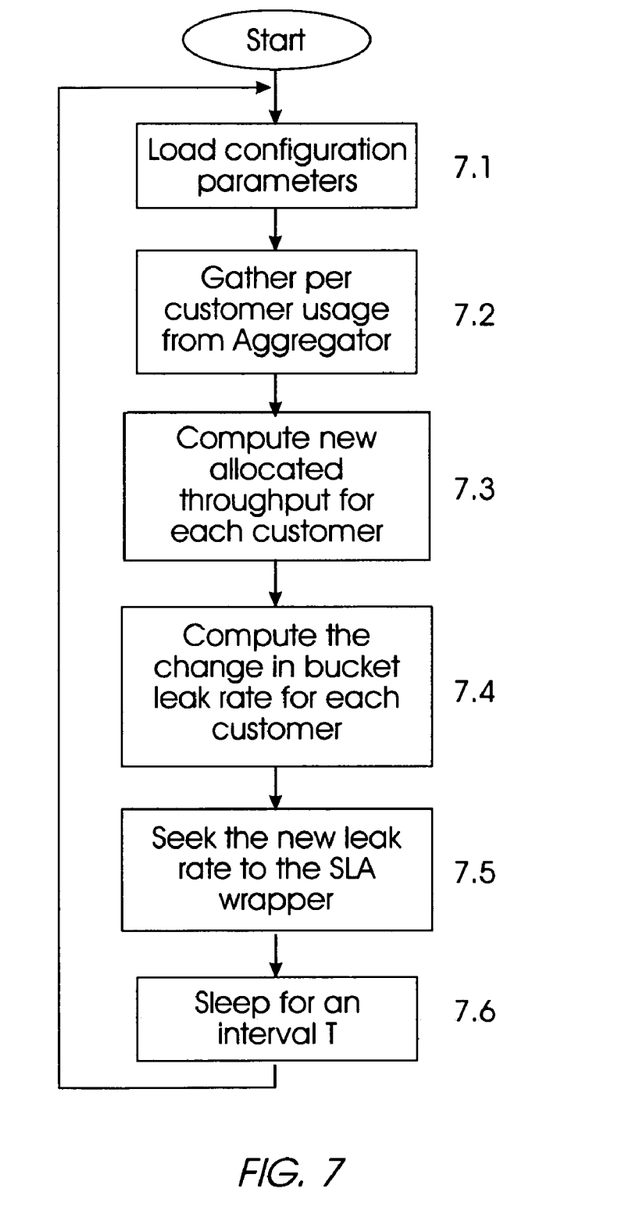
FIG. 7 is a flowchart for the functioning of Allocator module.

FIG. 7 is the flowchart for the functioning of Allocator module. In the first step the module loads all the configuration parameters (7.1). These configuration parameters are server statistics, allocation for various customers during the previous cycle and other parameters that affect the allocation. These parameters can also be manually modified. The allocator then gathers the per-customer usage statistics form the Aggregator (7.2). The statistics with the Aggregator include the dispatched requests during the previous cycle and the dropped requests. The next step involves calculation of new allocated throughput for each customer (7.3) using the statistics collected from the aggregator. Based on this the change in bucket leak rate for each customer is calculated (7.4). This new leak rate is then communicated to the SLA wrapper for the particular customer (7.5). After calculating and reporting the new leak rate for each and every customer, the Allocator module sleeps for a configurable period of time (7.6).

It will be apparent to those with ordinary skill in the art that the foregoing is merely illustrative and not intended to be exhaustive or limiting, having been presented by way of example only and that various modifications can be made within the scope of the above invention. For example there might be a billing module added which automatically bills the customer based on his usage of service. Similarly the specification describes algorithm for fair share of capacity amongst the current users, but the allocation of the resources could be done keeping a different set of objectives in mind such as increasing profits etc. In the foregoing description the clients are described as general computing system. The present invention can be realized in hardware, software or a combination of hardware and software. The service provider as described in the invention could either be realized in a centralized manner, on one computer system or the applications could be spread across several interconnected computer systems. Any kind of computer system or other apparatus adapted for carrying out the methods described herein is suited. A typical combination of hardware and software could be general purpose computer system with a computer program that, when loaded and executed, controls the computer system such that it carries out the methods described herein. The clients could also be cell phones, PDAs or other similar devices.

Accordingly, this invention is not to be considered limited to the specific examples chosen for purposes of disclosure, but rather to cover all changes and modifications, which do not constitute departures from the permissible scope of the present invention. The invention is therefore not limited by the description contained herein or by the drawings, but only by the claims.

What is claimed is:

1. A method of enabling automatic enforcement of Service Level Agreements (SLAs) in a client-server arrangement over a network, between customers running at least one application utilizing a software service provided by a service provider, said method comprising:
   intercepting service requests for said software service from users of said customers to a server of said service provider;
   automatically collecting usage statistics on each of said users, wherein said usage statistics comprise at least one of distribution of said requests, number of said requests, and frequency of said requests;
   aggregating said usage statistics from said users on a per-customer basis to determine current per-customer usage statistics, wherein each of said customers comprises at least one user;
   computing and adjusting allocations of said software service to each of said customers, wherein each allocation to each customer is based on said current per-customer usage statistics, on usage metrics that are specified in a service level agreement with said customer, and on a service capacity of said software service, wherein said service capacity comprises a rate of requests supportable by said server; and
   controlling usage of said software service by said customers based on said allocations, wherein said controlling of said usage of said software service further comprises:
   queuing said service requests from said customers that exceed said allocations;
   dispatching said service requests from said queue to said server at a configurable dispatch rate; and,
   modifying said dispatch rate for each of said customers.

2. The method as claimed in claim 1, wherein said usage statistics are weighted by values of parameters in said service requests.

3. The method as claimed in claim 1, wherein for each of said customers said usage metrics comprise a guaranteed aggregate throughput in requests per second.

4. The method as claimed in claim 1, further comprising triggering said modifying of said dispatch rate in response to predefined events, wherein said predefined events comprise at least one of elapsing of a predefined period of time, occurrence of system events and manual instigation of a trigger.

5. The method as claimed in claim 1, further comprising reporting said per-customer current usage statistics to said server at configurable intervals.

6. The method as claimed in claim 1, further comprising controlling said usage of said software service through manual intervention.

7. The method as claimed in claim 1, further comprising modifying SLA limits for any of said customers without having to restart said software service.

8. The method as claimed in claim 5, wherein said configurable intervals comprise elapsing of fixed time intervals and processing of a fixed number of service requests.

9. The method as claimed in claim 1, wherein said modifying of said dispatch rates is based upon at least one of the following policies: providing a fair share of said service capacity, maximizing revenue generation, ensuring high resource utilization and minimizing perturbation of the current allocation.

10. The method as claimed in claim 6, further comprising overriding said allocations and controlling said usage of said software service by sending control messages and setting key parameters for allocation of resources.

11. The method as claimed in claim 9, further comprising determining or dynamically updating an available service capacity by benchmarking or on the basis of current configuration and the status of utilization of services.

12. The method as claimed in claim 9, further comprising determining said fair share of said service capacity based on a guaranteed throughput and said available capacity of said server.

13. The method as claimed in claim 12, further comprising allowing each of said customers to exceed said guaranteed throughput when said server is lightly loaded.

14. A program storage device readable by machine, tangibly embodying a program of instructions executable by said machine to perform a method enabling automatic enforcement of a service level agreement in a system in a client-server arrangement over a network, between customers running at least one application utilizing a software service provided by a service provider, said method comprising:
   intercepting service requests for said software service from users of said customers to a server of said service providers;
   automatically collecting usage statistics on each of said users, wherein said usage statistics comprise at least one of distribution of said requests, number of said requests, and frequency of said requests;

aggregating said usage statistics from said users on a per-customer basis to determine current per-customer usage statistics, wherein each of said customers comprises at least one user;

computing and adjusting allocations of said software service to each of said customers, wherein each allocation to each customer is based on said current per-customer usage statistics, on usage metrics that are specified in a service level agreement with said customer, and on a service capacity of said software service, wherein said service capacity comprises a rate of requests supportable by said software service; and controlling usage of said software service by said customers based on said allocations, wherein said controlling of said usage of said software service further comprises:

queuing said service requests from said customers that exceed said allocations;

dispatching said service requests from said queue to said server at a configurable dispatch rate; and, modifying said dispatch rate for each of said customers.

15. The program storage device of claim 14, wherein said usage statistics are weighted by values of parameters in said service requests.

16. The program storage device of claim 14, for each of said customers said usage metrics comprise a guaranteed aggregate throughput in requests per second.

17. The program storage device of claim 14, further comprising triggering said modifying of said dispatch rate in response to predefined events, wherein said predefined events comprise at least one of elapsing of a predefined period of time, occurrence of system events, and manual instigation of a trigger.

18. The program storage device of claim 14, wherein said method further comprises reporting said usage statistics of said application for each of said customers to said server at configurable intervals.

19. The program storage device of claim 14, wherein said method further comprises controlling said usage of said software service through manual intervention.

20. The program storage device of claim 14, wherein said method further comprises modifying limits of said service level agreement for any of said customers without having to restart said software service.

21. The program storage device of claim 18, wherein said configurable intervals comprise elapsing of fixed time intervals and processing a fixed number of service requests.

22. The program storage device of claim 14, wherein said modifying of said dispatch rate is based on at least one of the following policies: providing a fair share of said service capacity, maximizing revenue generation, ensuring high resource utilization, and minimizing perturbation of current allocation.

23. The program storage device of claim 19, wherein said method further comprises overriding said allocations and controlling said usage of said services by sending control messages and setting key parameters for allocation of resources.

24. The program storage device of claim 22, wherein said method further comprises determining or dynamically updating an available service capacity of said server by one of benchmarking, current configuration, and status of utilization of services.

25. The program storage device of claim 24, wherein said method further comprises determining said fair share based on a guaranteed throughput and said available service capacity of said server.

26. The program storage device of claim 25, wherein said method further comprises allowing said customer to exceed said guaranteed throughput when said server is lightly loaded.

* * * * *